United States Patent Office 3,428,649
Patented Feb. 18, 1969

3,428,649
OXINDOLE DERIVATIVES
Janis Plostnieks, Philadelphia, Pa., assignor to McNeil Laboratories, Inc., a corporation of Pennsylvania
No Drawing. Continuation-in-part of application Ser. No. 460,576, June 1, 1965. This application Jan. 23, 1968, Ser. No. 699,761
U.S. Cl. 260—325   27 Claims
Int. Cl. C07d 27/42, 27/40

---

ABSTRACT OF THE DISCLOSURE

Oxindole derivatives are prepared by the interaction of isatins with appropriate alkylidene phosphoranes or phosphonate ester anions; these derivatives are used in the synthesis of other indoles.

---

This is a continuation-in-part of my copending application Ser. No. 460,576, filed June 1, 1965, and now abandoned.

This invention pertains to novel methods of preparing oxindole derivatives and to new and useful oxindoles prepared thereby. The invention particularly relates to new methods of preparing oxindoles having substituents attached in the 3-position by a carbon-carbon double bond.

One of the important features of the novel method herein is its application in the preparation of oxindole-3-acetic acid and derivatives thereof. It is interesting to note that, prior to 1953, oxindole-3-acetic acid had never been successfully prepared, although various reports of such had appeared in the literature as early as 1914 [Ber., 47, 354 (1914)] and 1923 [Helv. Chim. Acta., 6, 467 (1923)], including the patent literature [e.g., German Patent 431,510 (issued 1926)]. Later investigators, however, demonstrated that these varied attempts to secure oxindole-3-acetic acid had all resulted in rupture of the 5-membered ring moiety of the oxindole nucleus with subsequent formation of a 6-membered ring to yield 2-oxo-1,2,3,4-tetrahydroquinoline-4-carboxylic acid instead of the desired oxindole-3-acetic acid. In 1953, the synthesis of oxindole-3-acetic acid was achieved for the first time [Julian et al., J. Am. Chem. Soc., 75, 5305 (1953)]. As described hereinbelow, an additional method of preparing oxindole-3-acetic acid and its derivatives is now provided which presents several advantages over the existing art: high yields of desired products are obtained; less liklihood exists with regard to rupturing the 5-membered ring with subsequent rearrangement into a 6-membered ring; mild conditions are employed; and compounds which were heretofore inaccessible may now be synthesized with relative ease.

According to this invention, oxindole derivatives of the general formula:

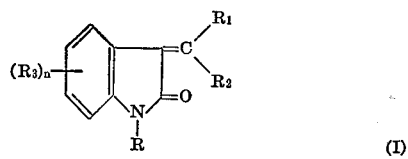

(I)

may be prepared by reacting an isatin of the general formula:

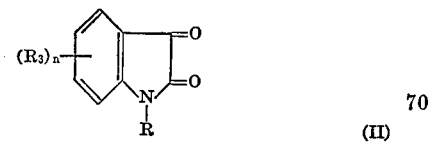

(II)

with a member selected from the group consisting of an alkylidene phosphorane of the general Formula III and a phosphonate ester anion of the general Formula IV:

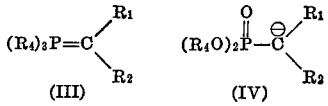

In the foregoing formulas, R is a member selected from the group consisting of hydrogen, lower alkyl, aralkyl, acyl and di-(lower alkyl)-amino-carbonyl-methyl; $R_1$ is a member selected from the group consisting of hydrogen, lower alkyl, phenyl and halo; $R_2$ is an electron withdrawing group; $R_3$ is a member selected from the group consisting of hydrogen, halo, lower alkyl, lower alkoxy, benzyloxy and nitro; $R_4$ is a member selected from the group consisting of lower alkyl, aryl, preferably phenyl and substituted phenyl, and aralkyl, preferably benzyl; and $n$ is an integer from 1 to 2.

As used herein, "lower alkyl" and "lower alkoxy" may be straight or branch chained and have from 1 to 7 carbon atoms, such as, for example, methyl, ethyl, propyl, isopropyl, butyl, tertiary-butyl, pentyl, hexyl, heptyl and the like, and the corresponding methoxy, ethoxy, isopropoxy, butoxy, etc. The term "halo" refers to halogens of atomic weight less than 80, i.e., fluoro, bromo and chloro. The term "acyl" includes the aliphatic, aromatic and heterocyclic acyls. Typical of such acyls are the lower alkanoyls, e.g., acetyl, propionyl, butyryl and the like; phenyl- and diphenyl-acetyl; benzoyl and substituted benzoyls, e.g., trifluoromethylbenzoyl, halobenzoyl and the like; thenoyl; furoyl; and the like. Among the preferred acyls are the lower alkanoyls and the benzoyls. The term "substituted phenyl" embraces phenyl having one or more substituents attached to it, such as, for example, lower alkyl; etherified hydroxy, e.g., lower alkoxy, aryloxy or aralkoxy; halo; haloalkyl, e.g., chloromethyl, trifluoromethyl, etc.; and the like. Among the preferred "electron withdrawing groups," i.e., $R_2$, that are operable herein are lower alkanoyl, including formyl; lower alkoxy carbonyl; benzyloxy carbonyl; benzoyl; carbamoyl; cyano; appropriately substituted phenyls, e.g., ortho- and para-substituted nitrophenyl, lower alkoxy carbonyl phenyl, formylphenyl and the like; carboxy; lower alkoxy carbonyl vinylene; and the like.

The foregoing reaction is advantageously carried out in organic solvents such as, for example, aromatic hydrocarbons, e.g., benzene, toluene, xylene and the like; lower alkanols, e.g., methanol, tertiary-butanol and the like; mixtures of said aromatic hydrocarbons and said lower alkanols; chlorinated hydrocarbons, e.g., carbon tetrachloride, chloroform, methylene chloride and the like; and ethers, e.g., tetrahydrofuran, dioxane, diethyl ether, ethylene glycol, and the like. Although ambient temperatures are generally sufficient, elevated temperatures may be advantageously employed. The desired reaction product (I), generally a solid, is readily recoverable from the reaction mixture and purified by conventional means, e.g., filtration, recrystallization, etc.

Methods of preparing alkylidene phosphoranes of Formula III will be found in Organic Reactions, vol. 14, page 287 et seq., A. C. Cope (ed.-in-chief) et al., published by John Wiley & Sons, Inc. (New York). The phosphonate ester anion of Formula IV may be preformed or prepared in situ and is obtainable from its respective conjugate acid, i.e., the corresponding phosphonic acid ester (IV–a), by the use of a base

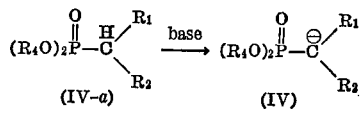

such as, for example, an alkali metal hydride or amide, e.g., sodium, potassium or lithium hydride or amide; an alkali metal lower alkoxide, e.g., sodium ethoxide, potassium tert-butoxide, and the like; an alkali metal or alkaline earth metal hydroxide, e.g., sodium, potassium or calcium hydroxide; and tertiary amines such as, for example, trialkyl amines, e.g., triethylamine, tributylamine and the like, and heterocyclic amines, e.g., N-alkyl piperidine, pyridine, N-alkyl morpholine, quinoline, and the like. Suitable solvents for the anion formation include those mentioned heretofore. The phosphonic acid esters (IV–a) serving as the source of the anions (IV), may be obtained from appropriate tri-$R_4$ phosphites and alkyl halides by an Arbuzow rearrangement:

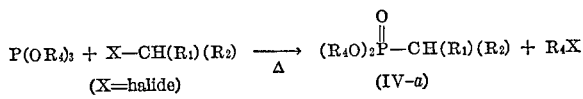

(X=halide)          (IV–a)

A few oxindole derivatives of Formula I, prepared by methods other than that described hereinabove, have been disclosed in the literature, for example, 2-oxo-$\Delta^{3,\alpha}$-indoline-methylacetic acid and ethyl 2-oxo-$\Delta^{3,\alpha}$-indoline acetate [Julian et al., J. Am. Chem. Soc., 75, 5305 (1953)], benzyl - 2 - oxo-$\Delta^{3,\alpha}$ - indoline acetate [Hallman, Chem. Ber., 95, 1138 (1962)]. Also disclosed in the literature are the mono-halo and di-halo derivatives of 2-oxo-$\Delta^{3,\alpha}$-indoline acetic acid [British Patent No. 266,539 (1927); German Patent No. 436,518 (1925)] prepared by the reaction of malonic acid with halo-substituted isatins. However, later investigators showed that the reaction of isatins with malonic acid gave quinoline carboxylic acids instead of the reported 2-oxo-$\Delta^{3,\alpha}$-indoline acetic acids. [Julian et al., J. Am. Chem. Soc., 75, 5305 (1953)].

To the extent, therefore, that the oxindole derivatives of Formula I are heretofore unknown, such novel oxindoles constitute an additional feature of this invention. Accordingly, such novel oxindole derivatives may be described by Formula I wherein R, $R_1$, $R_2$, and $R_3$ and $n$ are as heretofore described, provided that, when $R_2$ is selected from the group consisting of carboxy, lower alkoxy carbonyl, and benzyloxy carbonyl, at least one of said R and $R_3$ is other than hydrogen or lower alkyl, and further provided that, when $R_3$ is halo, at least one of said R and $R_1$ is other than hydrogen.

The novel compounds herein absorb ultra-violet (U.V.) light and accordingly can be employed as effective U.V. screening materials when incorporated in suitable vehicles such as, for example, transparent film-forming compositions and oils. Because of their general solubility in organic materials, they may be used as U.V.-absorbers in plastics and resins, such as, for example, polystyrene, polyethylene, polypropylene, polyacrylics (e.g., methacrylate resins, polyacrylamides, polyacrylonitrile fibers, etc.), polyamide (e.g., nylon) fibers and polyester fibers. The inclusion of about 0.01–5.0 percent of the absorber, based on the polymer weight, is usually sufficient to render protection against ultra-violet light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of polymers into fibers, etc.

In addition, the compounds represented by Formula I are useful in synthesis. They are, for example, valuable as intermediates in the production of 2-oxo-indolines which may bear various substitutents in the 3-position, depending on the synthetic manipulations of the olefinic moiety

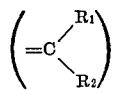

that are employed. Certain derivatives, for example, may be used in preparing 2-oxo-3-indoline-acetic acids. Certain derivatives are valuable in the formation of tryptamines. Typical syntheses, which constitute further features of this invention, are described hereinafter. The compounds thus afford the organic chemist with valuable and easily obtainable chemical building blocks in the area of indole chemistry and syntheses.

Of particular importance is the preparation of 2-oxo-3-indolineacetic acid and derivatives thereof (V) from oxindoles of Formula I wherein $R_2$ is benzyloxy carbonyl (I–a), and, preferably, $R_3$ is other than nitro. The process comprises converting the benzyl ester to the corresponding carboxylic acid and saturating the olefinic bond ($\Delta^{3,\alpha}$), for example, by means of hydrogen activated by a suitable catalyst, e.g., palladium-on-charcoal, in a suitable organic solvent such as, for example, ethanol, tetrahydrofuran, ethyl acetate, acetic acid and the like. In certain cases, for example, when R is p-halobenzyl, the 2-oxo-3-indoline-acetic acids (V) may be alternatively prepared from oxindoles of Formula I in which $R_2$ is lower alkoxy carbonyl, e.g., ethoxycarbonyl (I–b), the hydrolysis of which, such as by acidic hydrolysis, affords the corresponding 2-oxo-$\Delta^{3,\alpha}$-indolineacetic acid (VI). The olefinic bond ($\Delta^{3,\alpha}$) of (VI) may be subsequently saturated, for example, by catalytic hydrogenation, e.g., by means of hydrogen activated by palladium, platinum or nickel catalyst in a suitable organic solvent such as tetrahydrofuran, ethanol ethyl acetate, acetic acid and the like, to yield the desired 2-oxo-3-indolineacetic acid. In addition, direct catalytic hydrogenation of the olefinic lower alkyl esters of 2-oxo-3-indolineacetic acid (VII). The reaction schemes may be illustrated as follows:

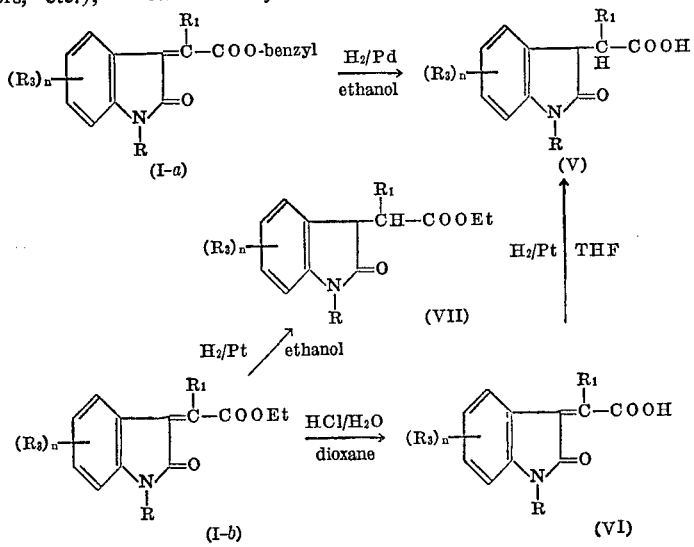

In accordance with the above procedures, novel 2-oxo-3-indolineacetic acids may be prepared such as 1-acyl-2-oxo-3-indolineacetic acid, wherein said acyl is a member selected from the group consisting of lower alkanoyl, benzoyl and halobenzoyl, preferably p-chlorobenzoyl, and 1-di-lower alkylaminocarbonyl-methyl-2-oxo-3 - indoline acetic acid, which compounds are also useful as ultraviolet absorbin agents in U.V. screens.

The 3-cyanomethylene - 2 - indoline derivatives represented below by Formula I–c, wherein $n$ is 1–2, R is hydrogen, lower alkyl or aralkyl, $R_1$ is hydrogen, lower alkyl or phenyl, and $R_3$ is hydrogen, lower alkyl, lower alkoxy, benzyloxy or halo, are convenient intermediates for preparing the corresponding 3-($\alpha$-$R_1$-$\beta$-amino-ethy) indoles represented by Formula VIII. Reduction of (I–c) by treatment with appropriate reducing agents such as, for example, alkali metal-aluminum hydrides, e.g., lithium aluminum hydride, $NaBH_4/AlCl_3$, diborane and the like in a suitable organic solvent,

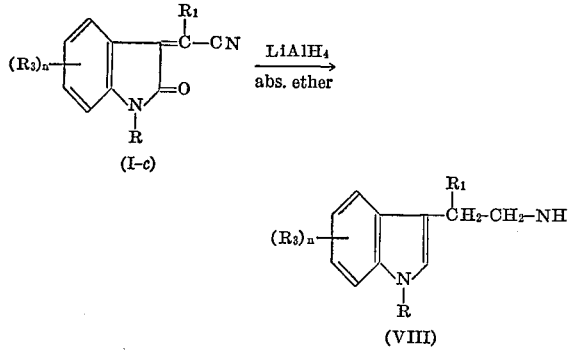

e.g., absolute ether affords the corresponding compounds VIII. When R, $R_1$ and $R_3$ are all hydrogen, the above reaction affords a convenient method for preparing the well-nown and heretofore difficulty accessible compound, tryptamine. When $R_3$ is 5-benzyloxy and R and $R_1$ are each hydrogen, compound VIII may be subjected to debenzylation, such as by means of catalytically activated hydrogen, to yield 3-(2-aminoethyl)-5-hydroxy-indole, also known as serotonim.

The following examples are intended to illustrate, but not to limit, the scope of the present invention.

Example I (A) Ethyl 2-oxo-$\Delta^{3,\alpha}$-indoline acetate.—Isatin (1.8 g., 0.0115 mole) and ethoxycarbonylmethylene triphenylphosphorane (4.0 g., 0.0115 mole) are suspended in 80 ml. of methylene chloride. An exothermic reaction takes place causing all solid to go into solution. The solution is stirred at room temperature for 30 minutes. The solution is removed in vacuo and the residue is crystallized from methanol, yielding 2.2 g. (0.010 mole, 87% yield) of ethyl 2-oxo-$\Delta^{3,\alpha}$-indoline acetate, orange needles, M.P. 163–165° C. After recrystallization from methanol, the M.P. is 168–169.5° C.

(B) By following the procedure of Example I(A), isatin is reacted with an equivalent quantity of carbamoyl-methylene triphenylphosphorane, benzoylmethylene triphenylphosphorane and $\alpha$-acetyl-$\alpha$-phenyl-methylene triphenylphosphorane, respectively, in lieu of the ethoxycarbonylmethylene triphenylphosphorane used therein to yield, as respective products, 2-oxo-3-carbamoylmethylene-indoline, 2-oxo-3-benzoylmethylene-indoline and 2-oxo-3-($\alpha$-acetyl-$\alpha$-phenyl-methylene)-$\Delta^{3,\alpha}$-indoline.

Example II

The procedure of Example I(A) is followed except that equivalent quantities of 5-methoxyisatin, 5-benzyloxyisatin, 5-ethylisatin and 5,6-dimethylisatin, respectively, are used in lieu of the isatin used therein to yield, as respective products, ethyl 5-methoxy-2-oxo-$\Delta^{3,\alpha}$-indoline acetate, ethyl 5 - benzyloxy - 2 -o xo-$\Delta^{3,\alpha}$-indoline acetate, ethyl 5-ethyl - 2 - oxo-$\Delta^{3,\alpha}$-indoline acetate and ethyl 5,6-dimethyl-2-oxo-$\Delta^{3,\alpha}$-indoline acetate.

Example III

Benzyl 2 - oxo - $\Delta^{3,\alpha}$-indoline acetate.—Isatin (1.5 g., 0.010 mole) and benzyloxycarbonylmethylene triphenylphosphorane (4.1 g., 0.010 mole) are suspended in 25 ml. of methylene chloride. An exothermic reaction takes place causing all solid to go into solution. Upon further stirring, an orange solid precipitates. The solid is removed by filtration and the solvent removed in vacuo. The two residues are combined and boiled with 50 ml. of ethanol. The suspension is filtered, giving 2.40 g. (0.0086 mole, 86% yield) of an orange solid, benzyl 2-oxo-$\Delta^{3,\alpha}$-indoline acetate, M.P. 200.5–201.5° C. Recrystallization from 1:1 toluene-butyl acetate raises the M.P. to 201.5–202.5° C.

Example IV

Following the procedure of Example III, benzyl 2-oxo-$\Delta^{3,\alpha}$-indoline acetate is obtained by using equivalent quantities of benzyloxycarbonylmethylene triethylphosphorane and benzyloxycarbonylmethylene tribenzylphosphorane, respectively, in place of the benzyloxycarbonylmethylene triphenylphosphorane used therein.

Example V 2-oxo - 3 - indolineacetic acid.—A suspension of 10 g. (0.0036 mole) of benzyl 2-oxo-$\Delta^{3,\alpha}$-indoline acetate in 50 ml. of absolute ethanol is hydrogenated for 1 hr. under 30 lbs. of hydrogen in the presence of 0.5 g. of 10% palladium-on-carbon catalyst. The catalyst is removed by filtration and the solvent evaporated in vacuo. The residue is crystallized from ether giving 0.67 g. (0.0035 mole, 92% yield) of a white solid, 2-oxo-3-indolineacetic acid, M.P. 144–146° C. The solid is recrystallized from ethyl-methyl ketone-benzene, M.P. 142–145° C.

Example VI

3 - cyanomethylene - 2 - indolinone.—Isatin (10.0 g., 0.068 mole) is suspended in 200 ml. of methylene chloride containing 10 ml. of triethylamine. Diethyl cyanomethyl phosphonate (12.0 g., 0.068 mole) is dissolved in 50 ml. of methylene chloride and added to the stirred isatin suspension over a period of 5 min. The isatin goes into solution over a period of 20 min., a slight exothermic raction being noticeable. The resulting dark red solution is washed twice with water and dried over anhydrous magnesium sulfate. The solvent is removed in vacuo and the residue is crystallized from methanol, yielding an orange solid, 3-cyanomethylene-2-indolinone, M.P. 180–185° C. Recrystallization from ethyl acetate raises the M.P. to 204–207° C.

Example VII

The procedure of Example VI is followed except that equivalent quantities of 5-methoxyisatin, 5-benzyloxyisatin, 5,6-dimethylisatin, 1-methylisatin, 1-acetylisatin, 1-benzoylisatin and 1-p-chlorobenzyl-5-methoxy-isatin, respectively, are used in lieu of the isatin used therein to yield, as respective products, the corresponding 5-methoxy, 5-benzyloxy, 5,6-dimethyl, 1-methyl, 1-acetyl, 1-benzoyl and 1-p-chlorobenzyl-5-methoxy derivatives of 3-cyanomethylene-2-indolinone.

Example VIII

3 - (2 - aminoethyl)-indole.—3 - cyanomethylene-2-indolinone (1.0 g., 0.0058 mole) is suspended in 100 ml. of absolute ether. Lithium aluminum hydride (2.0 g.) is added slowly over a period of 15 min. to the stirred suspension. The reaction mixture is stirred overnight at room temperature. Ten mls. of water are added slowly. The thick, white precipitate is removed by filtration. The ether solution is dried over anhydrous sodium sulfate and the solvent is removed in vacuo, leaving a yellow oil. The product, 3-(2-aminoethyl)-indole, also known as tryptamine, is isolated and characterized as its hydrochloride, M.P. 248–250° C.

Example IX

Benzyl 1-acetyl - 2 - oxo-$\Delta^{3,a}$-indoline acetate.—1-acetylisatin (3.0 g., 0.0158 mole) and benzyloxycarbonylmethylene triphenylphosphorane (6.35 g., 0.0158 mole) are suspended in 40 ml. of methylene chloride. An exothermic reaction takes place causing all solid to go into solution. The reaction mixture is stirred at room temperature for 15 min. and the solvent is removed in vacuo. The crystalline residue is boiled with 60 ml. of methanol. The yellow product, benzyl 1-acetyl-2-oxo-$\Delta^{3,a}$-indoline acetate, is removed by filtration; yield, 4.8 g. (0.0149 mole, 94%); M.P. 117–123° C. Recrystallization from ethyl acetate raises the M.P. to 130–131° C.

Example X (A) The procedure of Example IX is followed to prepare benzyl 2-oxo-$\Delta^{3,a}$-indoline acetate having various acyls attached in the 1-position. By substituting equivalent quantities of 1-benzoylisatin, 1-p-chlorobenzoylisatin, 1-thenoylisatin, 1-furoylisatin and 1-propionylisatin for the 1-acetylisatin used in Example IX, the respective 1-benzoyl, 1-p-chlorobenzoyl, 1-thenoyl, 1-furoyl and 1-propionyl derivatives of benzyl 2-oxo-$\Delta^{3,a}$-indoline acetate are obtained.

(B) By substituting an equivalent quantity of ethoxycarbonylmethylene triphenylphosphorane for the benzyloxycarbonylmethylene triphenylphosphorane used in Examples IX and X(A), the corresponding ethyl 1-acyl-2-oxo-$\Delta^{3,a}$-indoline acetates are obtained.

Example XI 1-acetyl - 2 - oxo-3-indolineacetic acid.—A suspension of 2.0 g. (0.0062 mole) of benzyl 1-acetyl-2-oxo-$\Delta^{3,a}$-indoline acetate in 50 ml. of absolute ethanol is hydrogenated for 1 hr. under 46 lbs. of hydrogen in the presence of 0.5 g. of 10% palladium-on-carbon catalyst. The catalyst is removed by filtration and the solvent evaporated in vacuo, thereby affording 1.35 g. (0.0058 mole, 93% yield) of a white solid, 1-acetyl-2-oxo-3-indolineacetic acid, M.P. 175–182° C. Recrystallization from ethyl acetate raises the M.P. to 180.5–182° C.

Example XII

Benzyl 5,7 - dichloro-2-oxo-$\Delta^{3,a}$-indoline acetate.—5,7-dichloroisatin (30.0 g., 0.139 mole) is suspended in 400 ml. of methylene chloride. The mixture is stirred vigorously and 57 g. (0.139 mole) of benzyloxycarbonylmethylene triphenylphosphorane are added in small portions over a period of 5 min. The exothermic reaction causes the solvent to boil. The solvent is evaporated and the solid residue is boiled in 200 ml. of methanol. The suspension is filtered, yielding 49.6 g. (0.139 mole, 100% yield) of an orange solid, benzyl 5,7-dichloro-2-oxo-$\Delta^{3,a}$-indoline acetate, M.P. 181–183° C. Recrystallization from a 1:1 mixture of toluene-butyl acetate raises the M.P. to 184.5–185.5° C.

Example XIII 5,7 - dichloro-2-oxo-3-indolineacetic acid.—A suspension of 2.0 g. (0.006 mole) of benzyl 5,7-dichloro-2-oxo-$\Delta^{3,a}$-indoline acetate in 50 ml. of absolute ethanol is hydrogenated for 1 hr. under 34 lbs. of hydrogen in the presence of 0.5 g. of 10% palladium-on-carbon catalyst. The catalyst is removed by filtration and the solvent evaporated in vacuo. The residue is crystallized from ether, yielding 1:1 g. (0.00425 mole, 74% yield) of 5,7-dichloro-2-oxo-3-indolineacetic acid, M.P. 225–228° C. Recrystallization from dimethylformamide-water raises the M.P. to 226–228°C.

Example XIV

Benzyl 5 - bromo-2-oxo-$\Delta^{3,a}$-indoline acetate.—Benzyl-oxycarbonylmethylene triphenylphosphorane (54.2 g., 0.132 mole) is dissolved in 300 ml. of methylene chloride. The mixture is stirred vigorously and 30.0 g. (0.132 mole) of 5-bromoisatin is added in small portions over a period of 10 min. The exothermic reaction causes the solvent to boil. The solvent is evaporated and the solid residue boiled in methanol. The suspension is filtered, yielding 36.9 g. (0.103 mole, 78% yield) of an orange solid, benzyl 5-bromo-2-oxo-$\Delta^{3,a}$-indoline acetate, M.P. 175–182° C. Recrystallization from 1:1 mixture of toluene-butyl acetate raises the M.P. to 185–187° C.

Example XV

Benzyl 5 - nitro - 2-oxo-$\Delta^{3,a}$-indoline acetate.—5-nitroisatin (10.0 g., 0.052 mole) is suspended in 175 ml. of methylene chloride. The mixture is stirred vigorously and 21.4 g. (0.052 mole) of benzyloxycarbonylmethylene triphenylphosphorane is added in small portions over a period of 5 min. (slightly exothermic). The reaction solution is washed with 2N hydrochloric acid and then water. The organic layer is separated and dried over magnesium sulfate and the solvent removed in vacuo. The residue is crystallized from methanol yielding a yellow solid, benzyl 5-nitro-2-oxo-$\Delta^{3,a}$-indoline acetate.

Example XVI (A) Benzyl 1-methyl-2 - oxo - $\Delta^{3,a}$-indoline acetate.—1-methylisatin (4.8 g., 0.03 mole) is dissolved in 75 ml. of methylene chloride. The solution is cooled in an ice-bath and benzyloxycarbonylmethylene triphenylphosphorane (12.3 g., 0.03 mole) is added slowly with stirring. The mixture is stirred at room temperature for 1.5 hrs. Evaporation of the solvent in vacuo and crystallization from methanol affords benzyl 1 - methyl - 2 - oxo-$\Delta^{3,a}$-indoline acetate as fine orange needles, M.P. 107–111° C. Recrystallization from the same solvent raises the M.P. to 115–117° C.

(B) The procedure of Example XVI(A) is followed to prepare other benzyl 1-lower alkly-2-oxo-$\Delta^{3,a}$-indoline acetates. By substituting an equivalent quantity of 1-ethylisatin, 1-propylisatin and 1-butylisatin, respectively, for the 1-methylisatin used therein, there are obtained as respective products, the corresponding 1-ethyl, 1-propyl and 1-butyl derivatives of benzyl 2-oxo-$\Delta^{3,a}$-indoline acetate.

Example XVII 1-methyl-2-oxo-indolineacetic acid.—Benzyl 1-methyl-2-oxo-$\Delta^{3,a}$-indoline acetate (2.7 g., 0.0092 mole) is suspended in 35 ml. of absolute ethanol and hydrogenated for 45 min. under 50 lbs. of hydrogen in the presence of 0.5 g. of 10% palladium-on-carbon catalyst. The catalyst is removed by filtration and the solvent is evaporated in vacuo. The residue is crystallized from acetone-benzene giving 1.72 g. (0.0077 mole, 84% yield) of 1-methyl-2-oxo-indolineacetic acid as a white solid, M.P. 171–175° C.

Example XVIII

Ethyl 1 - p - chlorobenzyl - 5 - methoxy-2-oxo-$\Delta^{3,a}$-indoline acetate.—Ethoxycarbonylmethylene triphenylphosphorane (2.3 g., 0.0066 mole) is dissolved in 30 ml. of methylene chloride and added to a solution of 2.0 g. (0.0066 mole) of 1-p-chlorobenzyl-5-methoxyisatin in 30 ml. of methylene chloride over a period of 30 min. The resulting dark red solution is kept overnight at room temperature. The solvent is removed in vacuo and the residue is boiled in 30 ml. of ethanol for 3 min. The suspension is cooled and filtered, giving 2.15 g. (0.0058 mole, 88% yield) of a red solid, ethyl 1-p-chlorobenzyl-5-methoxy-2-oxo-$\Delta^{3,a}$-indoline acetate, M.P. 149–151° C. Recrystallization from ethyl acetate raises the M.P. to 153.5–155° C.

Example XIX 1-p-chlorobenzyl - 5 - methoxy-2-oxo-$\Delta^{3,a}$-indolineacetic acid.—A solution of 8.0 g. (0.021 mole) of ethyl 1-p- chlorobenzyl-5-methoxy-2-oxo-Δ³,ᵅ-indoline acetate in 70 ml. of dioxane and 11 ml. of 9N aqueous hydrochloric acid is heated under reflux for 2 hrs. The red solution is diluted with water and extracted with ether. The ether solution is separated, dried over anhydrous magnesium sulfate, and the solvent evaporated in vacuo. The residue is crystallized from absolute ethanol giving 6.4 g. (0.019 mole, 90% yield) of a red solid, 1-p-chlorobenzyl-5-methoxy-2-oxo-Δ³,ᵅ-indolineacetic acid, M.P. 194–200° C. Recrystallization from absolute ethanol raises the M.P. to 208–209° C.

Example XX 1-p-chlorobenzyl - 5 - methoxy-2-oxo-3-indolineacetic acid.—A suspension of 11.7 g. (0.034 mole) of 1-p-chlorobenzyl-5-methoxy-2-oxo-Δ³,ᵅ-indolineacetic acid in 100 ml. of tetrahydrofuran is hydrogenated for 4 hrs. under 50 lbs. of hydrogen in the presence of 0.5 g. of platinum catalyst. The catalyst is removed by filtration and the solvent evaporated in vacuo. The residue is crystallized from acetonitrile yielding a white solid, 1-p-chlorobenzyl-5-methoxy-2-oxo-3-indolineacetic acid, M.P. 142.5–143.5° C.

Example XXI

Ethyl 1-p-chlorobenzyl - 5 - methoxy-2-oxo-3-indoline acetate.—A suspension of 12.0 g. (0.032 mole) of ethyl 1-p-chlorobenzyl-5-methoxy-2-oxo-Δ³,ᵅ-indoline acetate in 300 ml. of absolute ethanol is hydrogenated overnight under 50 lbs. of hydrogen in the presence of 0.3 g. of platinum catalyst. The catalyst is removed by filtration and the solvent is removed in vacuo. Crystallization from absolute ethanol gives 10.0 g. (0.026 mole, 81% yield) of a white solid, ethyl 1-p-chlorobenzyl-5-methoxy-2-oxo-3-indoline acetate, M.P. 120–121° C. Recrystallization from ethanol raises the M.P. to 124.5–125.5° C.

Example XXII

In accordance with the procedure outlined in Example I, isatin is reacted with an equivalent quantity of α-bromo - α - ethoxycarbonyl-methylene triphenylphosphorane, α-methyl - α - ethoxycarbonyl-methylene triphenylphosphorane, α-ethyl-α-ethoxycarbonyl-methylene tribenzylphosphorane, and α - phenyl - α - ethoxycarbonyl-methylene triphenylphosphorane respectively, in place of the ethoxycarbonylmethylene triphenylphosphorane used therein to yield, as respective products, the corresponding α-bromo, α-methyl, α-ethyl and α-phenyl derivatives of ethyl 2-oxo-Δ³,ᵅ-indoline acetate.

Example XXIII

Benzyl 2-oxo-Δ³,ᵅ-indoline acetate.—Isatin (1.5 g., 0.01 mole) is added to a solution of 4.9 g. (0.01 mole) of benzyloxycarbonylmethyl triphenylphosphonium bromide in 50 ml. of methanol. Two ml. of triethylamine is added and the reaction mixture is stirred for 4 hrs. at room temperature. The solution is concentrated and the product is removed by filtration. Recrystallization from 1:1 toluene-butyl acetate gives an orange solid, benzyl 2-oxo-Δ³,ᵅ-indoline acetate, M.P. 201.5–202.5° C.

Example XXIV

Ethyl 2-oxo-Δ³,ᵅ-indoline acetate.—Diethyl ethoxycarbonylmethyl phosphonate (1.9 g., 0.01 mole) is dissolved in 30 ml. of dry tetrahydrofuran. Sodium isatide (1.7 g., 0.01 mole) is added to the stirred reaction mixture. The resulting dark suspension is stirred overnight at room temperature. The solvent is removed in vacuo and the resulting residue is dissolved in methylene chloride and 1N hydrochloric acid. The organic layer is dried over anhydrous magnesium sulfate. The solvent is evaporated and the product purified by chromatography on alumina. Recrystallization from methanol gives an orange solid, ethyl 2-oxo-Δ³,ᵅ-indoline acetate, M.P. 166–167.5 C.

Example XXV

The procedure of Example XXIV is followed except that equivalent quantities of the phosphonate ester anion derived from diphenyl carbamoylmethyl phosphonate, dibenzyl acetylmethyl phosphonate, diethyl p-nitrobenzyl phosphonate, diethyl o-nitrobenzyl phosphonate, diethyl p-(lower alkoxy-carbonyl)-benzyl phosphonate, diethyl o-(lower alkoxy-carbonyl)-benzyl phosphonate, diethyl lower alkoxy-carbonyl-vinylene-methyl phosphonate, diethyl ethoxycarbonylmethyl phosphonate, diethyl α-bromo-α-benzoyl-methyl phosphonate, and diethyl α-phenyl-α-carboxy-methyl phosphonate, respectively, are used in lieu of the diethyl ethoxycarbonylmethyl phosphonate anion used therein to yield, as respective products, the corresponding 3-carbamoylmethylene, 3-acetylmethylene, 3 - p-nitro-benzylidene, 3 - o-nitrobenzylidene, 3-p-(lower alkoxy-carbonyl)-benzylidene, 3-o-(lower alkoxy-carbonyl)-benzylidene, 3-lower alkoxy-carbonyl-vinylene-methylene, 3 - ethoxycarbonylmethylene, 3-(α-bromo-α-benzoyl-methylene) and 3-(α-phenyl-α-carboxy-methylene) derivatives of 2-oxo-indoline.

Example XXVI

Benzyl 1 - (p-chlorobenzoyl) - 2-oxo-Δ³,ᵅ-indoline acetate.—1-(p-chlorobenzoyl)isatin (1.6 g., 0.0056 mole) is suspended in 20 ml. of methylene chloride. A solution of benzyloxycarbonylmethylene triphenylphosphorane (2.3 g., 0.0056 mole) in 20 ml. of methylene chloride is added slowly with stirring. The mixture is stirred for 1¼ hrs. at room temperature. Evaporation of the solvent in vacuo gives a lemon yellow solid which is triturated with hot methanol. The residual solid, which has a M.P. of 183–186° C. is recrystallized from methanol to give 1.8 g. (0.0043 mole, 76.9% yield) of benzyl 1-(p-chlorobenzoyl)-2-oxo-Δ³,ᵅ-indoline acetate as lemon yellow needles, M.P. 191–192° C.

Example XXVII (A) 1 - (p - chlorobenzoyl) - 2-oxo-indolineacetic acid.—Benzyl 1 - (p-chlorobenzoyl) - 2-oxo-Δ³,ᵅ-indoline acetate (1.0 g., 0.0024 mole) is suspended in 35 ml. of absolute ethanol and hydrogenated for 45 mins. under 35 lbs. of hydrogen in the presence of 0.15 g. of 10% palladium-on-carbon catalyst. The catalyst is removed by filtration and the solvent removed in vacuo. The residue is recrystallized from benzene-hexane, yielding 1-(p-chlorobenzoyl)-2-oxo-indolineacetic acid as a white solid, M.P. 170–172° C.

(B) By substituting an equivalent quantity of the 1-benzoyl, 1-thenoyl, 1-furoyl and 1-propionyl derivatives of benzyl 2-oxo-Δ³,ᵅ-indoline acetate obtained in Example X for the benzyl 1-(p-chlorobenzoyl)-2-oxo-Δ³,ᵅ-indoline acetate used in Example XXVII, the corresponding 1-acyl-2-oxo-indolineacetic acids are obtained.

Example XXVIII

Benzyl 1-benzyl-2-oxo-Δ³,ᵅ-indoline acetate.—1-benzyl-isatin (5.3 g., 0.022 mole) is dissolved in 30 ml. of methylene chloride. The solution is cooled in an ice bath and benzyloxycarbonylmethylene triphenylphosphorane (9.0 g., 0.022 mole) in 50 ml. of methylene chloride is added slowly with stirring. The mixture is stirred at room temperature for 2 hrs. Evaporation of the solvent in vacuo and treatment of the resultant oil with methanol gives an orange crystalline solid, benzyl 1-benzyl-2-oxo-Δ³,ᵅ-indoline acetate, M.P. 120–123° C. Recrystallization from the same solvent raises the M.P. to 125–126° C.

Example XXIX 1-benzyl-2-oxo-indolineacetic acid.—Benzyl 1-benzyl-2-oxo-Δ³,ᵅ-indoline acetate (3.6 g., 0.0097 mole) is suspended in 50 ml. of absolute ethanol and hydrogenated for 35 min. under 40 lbs. of hydrogen in the presence of 0.3 g. of 10% palladium-on-carbon catalyst. The catalyst is removed by filtration and the solvent removed in vacuo. The residue is crystallized from acetone-benzene giving 2.4 g. (0.0085 mole, 90% yield) of 1-benzyl-2-oxo-indolineacetic acid as a white solid, M.P. 131.5–132.5° C.

Example XXX

Benzyl 1 - (dimethylaminocarbonylmethyl) - 2 - oxo-$\Delta^{3,\alpha}$-indoline acetate.—1-(dimethylaminocarbonylmethyl)-isatin (3.21 g., 0.0138 mole) is suspended in 20 ml. of methylene chloride. The mixture is cooled in an ice bath and a solution of benzyloxycarbonylmethylene triphenylphosphorane (5.7 g., 0.0139 mole) in 15 ml. of methylene chloride is added slowly with stirring. A vigorous reaction ensues and the mixture becomes homogeneous. The solution is stirred at room temperature for 1 hr. Evaporation of the solvent in vacuo affords an orange solid which is recrystallized from methanol to give benzyl 1-(dimethylaminocarbonylmethyl)-2-oxo-$\Delta^{3,\alpha}$-indoline acetate, 4.8 g. (0.012 mole, 88.5% yield) as orange neddles, M.P. 180–181.5° C.

Example XXXI

1 - (dimethylaminocarbonylmethyl) - 2 - oxo-indolineacetic acid.—Benzyl 1-(dimethylaminocarbonylmethyl)-2-oxo-$\Delta^{3,\alpha}$-indoline acetate (4.6 g., 0.0117 mole) is suspended in 50 ml. of absolute ethanol and hydrogenated for 5 hrs. under 45 lbs. of hydrogen in the presence of 0.5 g. of 10% palladium-on-carbon catalyst. The catalyst is removed by filtration and leeched with 200 ml. of boiling absolute alcohol. The combined ethanol fractions are evaporated to dryness in vacuo. The residue is crystallized from absolute ethanol-ether giving 1-(dimethylaminocarbonylmethyl)-2-oxo-indolineacetic acid as fine white crystals, M.P. 237–239.5° C.

Example XXXII

The procedure of Example VIII is followed except that equivalent quantities of 3-cyanomethylene-5-methoxy-2-indolinone, 3 - cyanomethylene-5-benzyloxy-2-indolinone, 3 - cyanomethylene - 5,6 - dimethyl - 2 - indolinone, 1-methyl - 3-cyanomethylene-2-indolinone, and 1-p-chlorobenzyl - 3 - cyanomethylene-5-methoxy-2-indolinone, respectively, are used in place of the 3-cyanomethylene-2-indolinone used therein to yield, as respective products, the corresponding 5-methoxy, 5-benzyloxy, 5,6-dimethyl, 1-methyl, and 1-p-chlorobenzyl-5-methoxy derivatives of 3-(2-aminoethyl)-indole.

Example XXXIII

3 - (2 - aminoethyl) - 5 - hydroxyindole.—3-(2-aminoethyl)-5-benzyloxyindole (2.66 g., 0.01 mole) is dissolved in 100 ml. of absolute ethanol and hydrogenated for 4 hrs. under 50 lbs. of hydrogen in the presence of 0.5 g. of 10% palladium-on-carbon catalyst. The catalyst is removed and the product, 3-(2-aminoethyl)-5-hydroxyindole, also known as serotonin, is isolated as its hydrochloride by treatment with hydrochloric acid, M.P. 167–168° C.

Example XXXIV

1 - (p - chlorobenzyl) - 5 - methoxyisatin.—Ten grams (0.057 mole) of 5-methoxyisatin is added slowly to a suspension of 2.5 g. (0.057 mole) of sodium hydride (50% suspension in mineral oil) in 100 ml. of dimethylformamide. During the addition, the reaction is stirred vigorously and cooled in an ice-bath. p-Chlorobenzyl chloride (9.6 g., 0.06 mole) is added over a 15 min. period. The reaction mixture is stirred overnight at room temperature. Most of the solvent is evaporated in vacuo and water is cautiously added to the residue. The resulting solid is removed by filtration and treated with charcoal in 95% ethanol. Recrystallization from ethanol gives a red solid, 1-(p-chlorobenzyl)-5-methoxyisatin, M.P. 135–138° C.

Example XXXV 1-(p-chlorobenzoyl)isatin.—The sodium salt of isatin [see Moriconi & Murray, J. Org. Chem., 29, 3577 (1964)] (3.38 g., 0.02 mole) is suspended in 30 ml. of 1,2-dimethoxyethane. The mixture is stirred and cooled in an ice-bath. p-Chlorobenzoylchloride (4.96 g., 0.028 mole) in 30 ml. of 1,2-dimethoxyethane is added dropwise to the stirred mixture. The mixture is stirred at room temperature for 18 hrs. The reaction mixture is filtered and the filtrate evaporated to dryness. The combined precipitate and residue from the evaporation are stirred with 2×100 ml. of refluxing chloroform, filtered and the combined filtrates evaporated to dryness. The lemon yellow residue is recrystallized from ethyl acetate to give 1-(p-chlorobenzoyl)isatin as lemon yellow needles, M.P. 200–201° C.

Example XXXVI 1-(dimethylaminocarbonylmethyl)isatin.—The sodium salt of isatin (16.9 g., 0.1 mole) is suspended in 100 ml. of dimethylformamide. The mixture is cooled in an ice-bath. N,N-dimethylchloroacetamide (14.5 g., 0.12 mole) in 25 ml. of dimethylformamide is added slowly with stirring. An instantaneous reaction occurs. The mixture is stirred at room temperature for 1 hr. and allowed to stand overnight. The mixture is filtered and the precipitate is washed with cold water. Recrystallization from boiling water affords 1-(dimethylaminocarbonylmethyl)isatin as orange crystals, M.P. 190–191.5° C.

What is claimed is:

1. A method of preparing an oxindole of the formula:

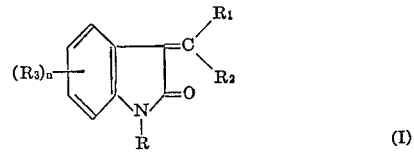

(I)

which comprises reacting an isatin having the formula:

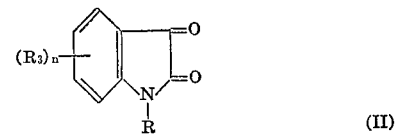

(II)

with a member selected from the group consisting of an alkylidene phosphorane having the Formula III and a phosphonate ester anion having the Formula IV:

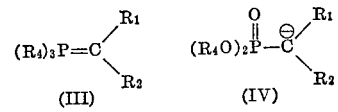

said anion being obtained from its respective conjugate acid, wherein $n$ is an integer from 1 to 2; R is a member selected from the group consisting of hydrogen, lower alkyl, benzyl, p-halobenzyl, lower alkanoyl, benzoyl, halobenzoyl, thenoyl, furoyl and di-(lower alkyl)-amino-carbonyl-methyl, said halo being of atomic weight less than 80; $R_1$ is a member selected from the group consisting of hydrogen, lower alkyl, phenyl and halo of atomic weight less than 80; $R_2$ is an electron withdrawing group selected from the group consisting of lower alkanoyl, lower alkoxy-carbonyl, benzyloxy carbonyl, benzoyl, carbamoyl, cyano, p-nitrophenyl, o-nitrophenyl p-(lower alkoxy-carbonyl)-phenyl, o-(lower alkoxy-carbonyl)-phenyl, carboxy and lower alkoxy-carboxy-vinylene; $R_3$ is a member selected from the group consisting of hydrogen, lower alkyl, lower alkoxy, benzyloxy, nitro and halo of atomic weight less than 80; and $R_4$ is a member selected from the group consisting of phenyl, benzyl and lower alkyl.

2. A method of preparing an oxindole of the formula:

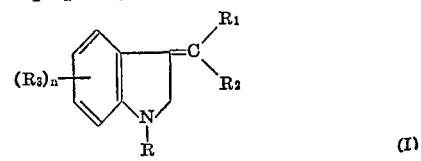

(I)

which comprises reacting an isatin having the formula:

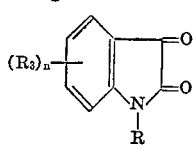

with an alkylene phosphorane having the formula:

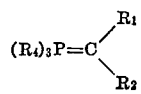

wherein $n$ is an integer from 1 to 2; R is a member selected from the group consisting of hydrogen, lower alkyl, benzyl, p-halobenzyl, lower alkanoyl, benzoyl, halobenzoyl, thenoyl, furoyl, and di-(lower alkyl)-amino-carbonyl-methyl, said halo being of atomic weight less than 80; $R_1$ is a member selected from the group consisting of hydrogen, lower alkyl, phenyl and halo of atomic weight less than 80; $R_2$ is an electron withdrawing group selected from the group consisting of lower alkanoyl, lower alkoxy-carbonyl, benzyloxy carbonyl, benzoyl, carbamoyl, cyano, p-nitrophenyl, o-nitrophenyl, p-(lower alkoxy-carbonyl)-phenyl, o-(lower alkoxy-carbonyl)-phenyl, carboxy and lower alkoxy-carboxy-vinylene; $R_3$ is a member selected from the group consisting of hydrogen, lower alkyl, lower alkoxy, benzyloxy, nitro and halo of atomic weight less than 80; and $R_4$ is a member selected from the group consisting of phenyl, benzyl and lower alkyl.

3. A method of preparing an oxindole of the formula:

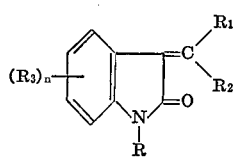

which comprises reacting an isatin having the formula:

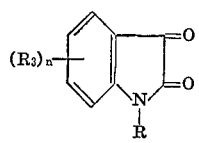

with a phosphonate ester anion having the formula:

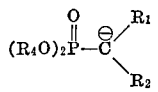

said anion being obtained from its respective conjugate acid, wherein $n$ is an integer from 1 to 2; R is a member selected from the group consisting of hydrogen, lower alkyl, benzyl, p-halobenzyl, lower alkanoyl, benzoyl, halobenzoyl, thenoyl, furoyl and di-(lower alkyl)-amino-carbonyl-methyl, said halo being of atomic weight less than 80; $R_1$ is a member selected from the group consisting of hydrogen, lower alkyl, phenyl and halo of atomic weight less than 80; $R_2$ is an electron withdrawing group selected from the group consisting of lower alkanoyl, lower alkoxy-carbonyl, benzyloxy carbonyl, benzoyl, carbamoyl, cyano, p-nitrophenyl, o-nitrophenyl, p-(lower alkoxy-carbonyl)-phenyl, o-(lower alkoxy-carbonyl)-phenyl, carboxy and lower alkoxy-carboxy-vinylene; $R_3$ is a member selected from the group consisting of hydrogen, lower alkyl, lower alkoxy, benzyloxy, nitro and halo of atomic weight less than 80; and $R_4$ is a member selected from the group consisting of phenyl, benzyl and lower alkyl.

4. A method of preparing a lower alkyl ester of 2-oxo-$\Delta^{3,\alpha}$-indolineacetic acid which comprises reacting isatin with a lower alkoxycarbonylmethylene triphenylphosphorane.

5. A method of preparing benzyl 2-oxo-$\Delta^{3,\alpha}$-indoline acetate which comprises reacting isatin with benzyloxycarbonylmethylene triphenylphosphorane.

6. A method of preparing benzyl 1-(lower alkyl)-2-oxo-$\Delta^{3,\alpha}$-indoline acetate which comprises reacting 1-(lower alkyl)-isatin with benzyloxycarbonylmethylene triphenylphosphorane.

7. A method of preparing 3-cyanomethylene-2-indolinone which comprises reacting isatin with diethylcyanomethyl phosphonate anion, said anion being obtained from its respective conjugate acid.

8. A method of preparing a lower alkyl ester of 1-p-halobenzyl-5-lower alkoxy-2-oxo-$\Delta^{3,\alpha}$-indolineacetic acid which comprises reacting 1-p-halobenzyl-5-lower alkoxy-isatin with a lower alkoxycarbonylmethylene triphenylphosphorane, said halo being of atomic weight less than 80.

9. An oxindole of the formula:

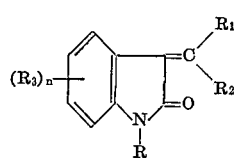

wherein $n$ is an integer from 1 to 2; R is a member selected from the group consisting of hydrogen, lower alkyl, benzyl, p - halobenzyl, lower alkanoyl, benzoyl, halobenzoyl, thenoyl, furoyl and di-(lower alkyl)-amino-carbonyl-methyl, said halo being of atomic weight less than 80; $R_1$ is a member selected from the group consisting of hydrogen, lower alkyl, phenyl and halo of atomic weight less than 80; $R_2$ is an electron withdrawing group selected from the group consisting of carboxy, lower alkoxy-carbonyl and benzyloxy-carbonyl; and $R_3$ is a member selected from the group consisting of hydrogen, lower alkyl, lower alkoxy, benzyloxy, nitro and halo of atomic weight less than 80; provided that at least one of said R and $R_3$ is other than hydrogen or lower alkyl; and provided that, when $R_3$ is halo, at least one of said R and $R_1$ is other than hydrogen.

10. Benzyl 1-acetyl-2-oxo-$\Delta^{3,\alpha}$-indoline acetate.

11. Lower alkyl 1-acetyl-2-oxo-$\Delta^{3,\alpha}$-indoline acetate.

12. Benzyl 5-nitro-2-oxo-$\Delta^{3,\alpha}$-indoline acetate.

13. Ethyl 1 - p - chlorobenzyl - 5-methoxy-2-oxo-$\Delta^{3,\alpha}$-indoline acetate.

14. Benzyl 1-dimethylaminocarbonylmethyl-2-oxo-$\Delta^{3,\alpha}$-indoline acetate.

15. Benzyl 1 - (p - chlorobenzoyl)-2-oxo-$\Delta^{3,\alpha}$-indoline acetate.

16. Benzyl 1-benzyl-2-oxo-$\Delta^{3,\alpha}$-indoline acetate.

17. 1 - p - chlorobenzyl-5-methoxy-2-oxo-$\Delta^{3,\alpha}$-indolineacetic acid.

18. 1-acyl-2-oxo-3-indolineacetic acid wherein said acyl is a member selected from the group consisting of lower alkanoyl, benzoyl and halobenzoyl, said halo being of atomic weight less than 80.

19. 1-acetyl-2-oxo-3-indolineacetic acid.

20. 1-p-chlorobenzoyl-2-oxo-3-indolineacetic acid.

21. 1-di-lower alkylaminocarbonylmethyl-2-oxo-3-indolineacetic acid.

22. A method of preparing a 2-oxo-3-indolineacetic acid having the formula:

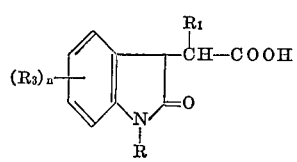

wherein $n$ is an integer from 1 to 2, R is a member selected from the group consisting of hydrogen, lower alkyl, benzyl, p-halobenzyl, lower alkanoyl, benzoyl, halobenzoyl, thenoyl, furoyl and di-(lower alkyl)-amino-carbonyl-methyl, said halo being of atomic weight less than 80; $R_1$ is a member selected from the group consisting of hydrogen, lower alkyl, phenyl and halo of atomic weight less than 80; and $R_3$ is a member selected from the group consisting of hydrogen, lower alkyl, lower alkoxy and halo of atomic weight less than 80, which comprises reacting an isatin having the formula:

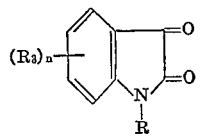

wherein $n$, R and $R_3$ are as heretofore defined, with a member selected from the group consisting of an alkylidene phosphorane of the formula

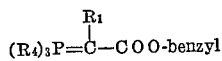

and a phosphonate ester anion of the formula

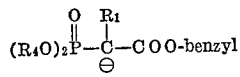

said anion being obtained from its respective conjugate acid, in which $R_1$ is as heretofore defined and $R_4$ is a member selected from the group consisting of phenyl, benzyl and lower alkyl, thereby forming benzyl 2-oxo-$\Delta^{3,\alpha}$-indoline acetate of the formula:

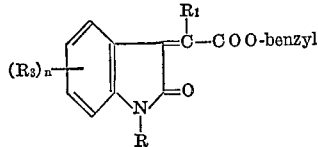

and subsequently treating said benzyl 2-oxo-$\Delta^{3,\alpha}$-indoline acetate with catalytically activated hydrogen.

23. A method of preparing 2-oxo-3-indolineacetic acid which comprises reacting isatin with benzyloxycarbonylmethylene triphenylphosphorane and subsequently treating the thus obtained benzyl 2-oxo-$\Delta^{3,\alpha}$-indoline acetate with catalytically activated hydrogen.

24. A method of preparing 1-p-halobenzyl-5-lower alkoxy-2-oxo-3-indolineacetic acid which comprises reacting 1-p-halobenzyl-5-lower alkoxy-isatin with lower alkoxy-carbonyl-methylene triphenylphosphorane, hydrolyzing the thus obtained lower alkoxy 1-p-halobenzyl-5-lower alkoxy-2-oxo-$\Delta^{3,\alpha}$-indoline acetate to form 1-p-halobenzyl-5-lower alkoxy-2-oxo-$\Delta^{3,\alpha}$-indolineacetic acid, and subsequently treating the latter with catalytically activated hydrogen, said halo being of atomic weight less than 80.

25. A method of preparing a 3-($\alpha$-$R_1$-$\beta$-amino-ethyl)-indole having the formula:

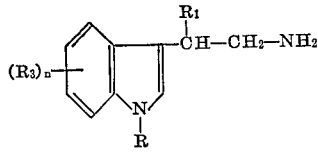

wherein $n$ is an integer from 1 to 2, R is a member selected from the group consisting of hydrogen, lower alkyl, benzyl and p-halobenzyl, said halo being of atomic weight less than 80, $R_1$ is a member selected from the group consisting of hydrogen, lower alkyl and phenyl, and $R_3$ is a member selected from the group consisting of hydrogen, lower alkyl, lower alkoxy, benzyloxy and halo of atomic weight less than 80, which comprises reacting an isatin of the formula:

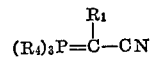

wherein $n$, R and $R_3$ are as heretofore defined, with a member selected from the group consisting of an alkylidene phosphorane of the formula

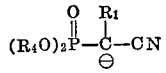

and a phosphonate ester anion of the formula

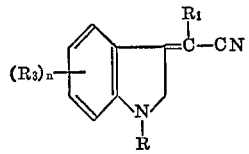

said anion being obtained from its respective conjugate acid, in which $R_1$ is as heretofore defined and $R_4$ is a member selected from the group consisting of phenyl, benzyl and lower alkyl, thereby forming 3-cyanomethylene-2-indolinone having the formula:

and subsequently reducing said indolinone to the desired 3-($\alpha$-$R_1$-$\beta$-amino-ethyl)-indole.

26. A mehod of preparing tryptamine which comprises reacting isatin with di-lower alkyl-cyanomethyl phosphonate anion, said anion being obtained from its respective conjugate acid, and subsequently reducing the thus obtained 3-cyanomethylene-2-indolinone by treatment with an alkali metal-aluminum-hydride in a suitable organic solvent.

27. A method of preparing serotonin which comprises reacting 5-benzyloxy-isatin with di-lower alkyl-cyanomethyl phosphonate anion, said anion being obtained from its respective conjugate acid, reducing the thus obtained 3 - cyanomethylene - 5 - benzyloxy-2-indolinone by treatment with an alkali metal-aluminum-hydride in a suitable organic solvent, thereby forming 3-(2-aminoethyl)-5-benzyloxy-indole, and subsequently debenzylating said indole by treatment with catalytically activated hydrogen to form serotonin.

References Cited

Hallman, Chem. Ber. 95:1138 (1962).

NICHOLAS S. RIZZO, *Primary Examiner.*

J. A. NARCAVAGE, *Assistant Examiner.*

U.S. Cl. X.R.

260—326.15, 240, 45.8

UNITED STATES PATENT OFFICE

CERTIFICATE OF CORRECTION

Patent No. 3,428,649 February 18, 1969

Janis Plostnieks

It is certified that error appears in the above identified patent and that said Letters Patent are hereby corrected as shown below:

Column 2, line 62, "287" should read -- 278 --. Column 5, lines 25 to 35, that portion of the formula reading "$-CH_2-NH$" should read -- $-CH_2-NH_2$ --; line 43, "serotonim" should read -- serotonin --.

Signed and sealed this 24th day of March 1970.

(SEAL)
Attest:

Edward M. Fletcher, Jr.
Attesting Officer

WILLIAM E. SCHUYLER, JR.
Commissioner of Patents